United States Patent [19]

Chen et al.

[11] Patent Number: 5,219,665
[45] Date of Patent: Jun. 15, 1993

[54] FABRICATED ARTICLES WITH IMPROVED RESISTANCE TO HYDROHALOCARBONS

[75] Inventors: John C. Chen, Hockessin, Del.; Anita N. DiAndreth, Orange, Tex.

[73] Assignee: E. I. Du Pont de Nemours and Company, Wilmington, Del.

[21] Appl. No.: 734,772

[22] Filed: Jul. 23, 1991

Related U.S. Application Data

[63] Continuation-in-part of Ser. No. 648,007, Jan. 30, 1991, abandoned.

[51] Int. Cl.$^5$ .................. B32B 27/08; B32B 27/28; B32B 27/30
[52] U.S. Cl. .................. 428/515; 220/415; 220/431; 312/236; 312/400; 312/401; 428/35.7; 428/36.6; 428/71; 428/305.5; 428/314.4; 428/319.7; 428/519; 428/520
[58] Field of Search .................. 428/35.7, 36.6, 71, 428/305.5, 314.4, 319.7, 515, 519, 520; 220/415, 431; 312/400, 401, 236

[56] References Cited

U.S. PATENT DOCUMENTS

| | | | |
|---|---|---|---|
| 3,780,140 | 12/1973 | Hammer | 525/185 |
| 3,857,754 | 12/1974 | Hirata et al. | 428/35.7 |
| 4,082,854 | 4/1978 | Yamada et al. | 426/106 |
| 4,600,746 | 7/1986 | Schmukler et al. | 525/57 |
| 4,610,914 | 9/1986 | Newsome | 428/216 |
| 4,645,695 | 2/1987 | Negi et al. | 428/35.7 |
| 4,855,363 | 8/1989 | Moteki | 525/207 |
| 4,861,676 | 8/1989 | Lee | 428/516 |
| 4,877,662 | 10/1989 | Yazaki et al. | 428/36.7 |
| 4,971,864 | 11/1990 | McCord | 428/516 |
| 4,990,562 | 2/1991 | Chou et al. | 525/58 |

FOREIGN PATENT DOCUMENTS

| | | |
|---|---|---|
| 266994 | 5/1988 | European Pat. Off. |
| 369604 | 5/1990 | European Pat. Off. |
| 2-35291 | 2/1990 | Japan |
| WO89/04348 | 5/1989 | PCT Int'l Appl. |

Primary Examiner—William J. Van Balen
Attorney, Agent, or Firm—Konrad Kaeding

[57] ABSTRACT

A multiple layer article of a thermoformable structural polymeric layer which is susceptible to damage upon exposure to hydrohalocarbon blowing agents and a polymeric layer which is a barrier to such hydrohalocarbon blowing agents provides a useful refrigerator liner. Related structures are useful for preventing the migration of hydrohalocarbons.

6 Claims, 3 Drawing Sheets

FABRICATED ARTICLES WITH IMPROVED RESISTANCE TO HYDROHALOCARBONS

BACKGROUND OF THE INVENTION

This application is a continuation-in-part of U.S. application Ser. No. 07/648,007, filed Jan. 30, 1991 is now abandoned, the disclosure of which is incorporated herein by reference.

This invention relates to articles with barrier properties toward hydrohalocarbons and a method for providing a barrier against penetration by hydrohalocarbons.

Chlorofluorocarbons such as Freon®11 ($CFCl_3$) have been widely used as refrigerants, blowing agents, and propellants. Recent concern about the environmental effects of such materials, however, has prompted efforts to seek replacement in various applications by partially halogenated blowing agents or refrigerants, such as hydrochlorofluorocarbon ("HCFC") 123 ($CHCl_2CF_3$) or hydrofluorocarbon ("HFC") 134A ($CH_2FCF_3$). Such materials are a liquid or gas (thus mobile) at or near room temperature and are believed to be significantly more benign to the environment. Unfortunately it has been found that these replacements can often more readily penetrate polymers which are good barriers to the fully halogenated materials. Such penetration can lead to loss of refrigerant through hoses or tubing in certain applications. Other problems may also result, including solvent-induced stress cracking, distortion, or other interaction of polymers which may come into contact with the HCFC. Structural polymers such as acrylonitrile-butadiene-styrene polymer (ABS) or high impact polystyrene (HIPS) are commonly used to form the plastic liners of refrigerators, and they may exhibit severe disfiguration or cracking when HCFCs are used as blowing agents for insulative foam adjacent to the liner. The present invention provides a solution to these problems.

Insulative liners for refrigerators and freezers are well known. They are commonly formed by a process which has been described in U.S. Pat. No. 3,960,631. This patent discloses a liner which includes a plastic wall provided with a release layer on one surface. The release layer has a limited adhesion with an insulating foam which is subsequently foamed in place against the release layer. The release layer permits separation of the liner from the foam as a result of differential thermal contraction of the liner and foam, and thereby avoids stress cracking of the liner.

A variety of polymers have been used to provide a functional barrier. For example, Japanese Application 62 044,446 discloses a laminate of of a saponified terpolymeric layer of 0.1–3 mol% acrylonitrile units, 20–55 mol% ethylene units, and vinyl acetate units, greater than 98% saponified, and a thermoplastic resin layer. The laminate has good barrier properties.

Japanese application 60 031,938 discloses extrusion lamination of a molten mixture of high density polyethylene and low density polyethylene with a substrate sheet. In order to assure sufficient extrusion workability and moisture impermeability, the low density polyethylene is blended in an amount of at least 10 wt.%. The laminated sheet has barrier activity for gases and organic vapors and resistance against stress cracking.

European Applications 305,146 and 380,123 disclose blends of ethylene vinyl alcohol copolymer with a minor amount of amorphous polyamide copolymer and their use as an oxygen-barrier layer in thermoformed multilayer structures.

Japanese application 02 035,291 discloses a low permeability hose for use in a refrigerant. An intermediate layer is a permeation preventing layer comprising an ethylene vinyl alcohol copolymer. The hose is useful in transferring a refrigerant such as Freon® gas, or gasoline or light oil.

SUMMARY OF THE INVENTION

The present invention provides a method for preventing migration of a mobile hydrohalocarbon from a first volume containing said hydrohalocarbon to a second volume substantially free from said hydrohalocarbon, comprising interposing a substantially continuous layer of vinyl alcohol polymer composition between said first and second volumes.

The invention further provides an article comprising a substantially continuous layer of vinyl alcohol polymer composition which at least partially encloses a volume designed to contain a mobile hydrohalocarbon, whereby migration of the hydrohalocarbon from said volume is reduced. More specifically, the invention provides such an article in the form of a refrigerator liner.

In addition, the invention provides a multiple layer sheet suitable for combination with at least one thermoformable polymeric structural layer of a styrene-based polymer to form a multiple layer, thermoformable article having barrier properties, said multiple layer sheet comprising at least one layer of an ethylene vinyl alcohol copolymer and at least one layer of a polymeric compatibilizer, said compatibilizer being present in a sufficient amount and having sufficient compatibility with the ethylene vinyl alcohol copolymer and with the polymer of said thermoformable polymeric structural layer to compatibilize a melt blend prepared by comminuting and melting the layers of said thermoformable article.

Furthermore, the invention provides a process for preparing a liner for an insulated cabinet, comprising the steps of:

(a) preparing a multiple layer structure comprising a thermoformable structural polymeric layer which is susceptible to damage upon exposure to hydrohalocarbon blowing agents and a polymeric layer which is a barrier to such hydrohalocarbon blowing agents, said layer extending substantially continuously over said structural layer and comprising a thermoformable vinyl alcohol polymer composition;

(b) thermoforming the multiple layer structure to take a three-dimensional shape suitable for use as at least a portion of a liner for an insulated cabinet;

(c) supplying an outer member of a suitable size and shape that said thermoformed structure can be assembled thereinto while maintaining a clearance between said outer shell and said thermoformed structure;

(d) assembling the thermoformed structure to said outer member, the polymeric barrier layer of said thermoformed structure facing towards said outer member, while leaving a clearance between said outer member and said thermoformed structure sufficient to contain an insulative amount of foamed polymer; and (e) injecting a foamable polymeric composition comprising a foamable polymer or polymer precursor and a hydrohalocarbon blowing agent into the clearance between said thermoformed structure and said outer member, whereby said foamable composition expands to substantially fill said clearance, thereby forming an insulative foamed polymer layer.

BRIEF DESCRIPTION OF THE DRAWINGS

FIG. 6 is a cross sectional diagram of an embodiment of the present invention in the form of a tube.

DETAILED DESCRIPTION OF THE INVENTION

The present invention generally includes an article comprising a substantially continuous layer of vinyl alcohol polymer composition which at least partially encloses a volume designed to contain a mobile hydrohalocarbon. The term "encloses" in the context of this invention is to be interpreted broadly. It includes, at one extreme, embodiments in which the vinyl alcohol polymer substantially surrounds the designated volume, as in a tube or a container. It also includes, however, embodiments in which the vinyl alcohol polymer at least partially separates or seals off one or more surfaces of a volume which may be largely defined by other structural members. A common feature of such embodiments is that the vinyl alcohol polymer serves to prevent or minimize migration of a hydrohalocarbon into or out of a volume in which it is to be contained (or excluded).

One embodiment of the present invention is a multiple layered article in which a thermoformable structural layer is protected from damage from exposure to certain mobile hydrohalocarbons when used as e.g. blowing agents. The structural layer is thus protected by the present invention from the effects of such blowing agents during the process of injecting and foaming an adjacent polymer. A number of structural polymeric materials are susceptible to damage under such conditions, when certain halocarbons, particularly certain hydrohalocarbons, are employed, because hydrohalocarbons are more aggressive solvents than their fully halogenated counterparts, perhaps because of their greater polarity. Polymeric materials which are thus susceptible to damage include semiamorphous polymers such as polystyrene, styrene-acrylonitrile copolymers such as acrylonitrile-butadiene-styrene copolymer, high impact polystyrene, polycarbonate, acrylics, styrene-maleic anhydride copolymers, polyvinyl chloride, and amorphous polyesters such as PETG (glycol modified PET copolyesters). Most typically such a layer is a styrene-based polymer such as high impact polystyrene or ABS copolymer, since these materials are commonly used as inner liners for refrigerators, freezers, and other insulated cabinets. High impact polystyrene (HIPS) is polystyrene modified by styrene-butadiene rubber. ABS copolymer is acrylonitrile butadiene styrene terpolymer, containing monomer units in various proportions, known to those skilled in the art. Such materials are particularly useful because they are comparatively strong, tough, and rigid and can be easily thermoformed into three-dimensional shapes characteristic of inner liners of refrigerators and the like. The thickness of the structural polymeric layer will depend on the particular application at hand; for a refrigerator liner, the thickness is typically about 0.25 to about 2.5 mm.

Figure 1:
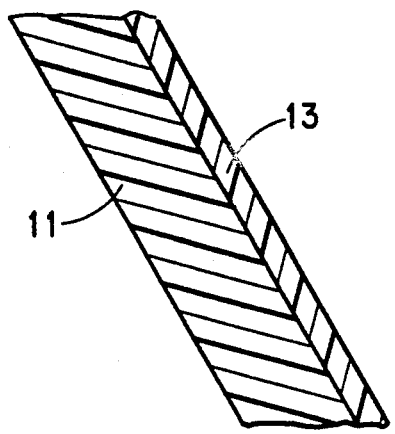
FIG. 1 is a cross sectional view of an embodiment of the invention.

Adjacent to the structural polymer layer in this embodiment is a layer of a polymeric material which is a barrier to such hydrohalocarbon blowing agents. This relationship is shown in FIG. 1, where 11 represents the structural layer and 13 represents the barrier layer. The barrier layer extends substantially continuously over the structural layer and serves to protect the structural layer from damage caused by exposure to the hydrohalocarbons. The polymeric barrier layer therefor must not only have excellent barrier properties towards hydrohalocarbons used as foam blowing agents, but it must also be suitable for thermoforming. That is, it should either adhere to the structural layer or it must be capable of being adhered by means of a suitable adhesive. Furthermore, it should be thermoformable at a temperature compatible with the thermoforming conditions used for the structural polymer layer.

The barrier layer is preferably a vinyl alcohol polymer composition. In particular, an ethylene vinyl alcohol copolymer composition is preferred, although other related polymers can also be used. For example, partially hydrolyzed polyvinyl acetate may be suitable for some applications; polyvinyl alcohol itself may be useful under certain circumstances if it is adequately plasticized. The preferred ethylene vinyl alcohol copolymer composition is largely or entirely a copolymer of about 25 to about 60 mole percent ethylene monomer moieties and about 40 to about 75 mole percent vinyl alcohol (i.e. saponified vinyl acetate) monomer moieties. For applications for which barrier properties are particularly important, the copolymer will preferably comprise about 30 to about 45 mole percent ethylene monomer and about 65 to about 70 mole percent vinyl alcohol. For applications in which ease of thermoformability is particularly important, the copolymer will preferably comprise about 35 to about 60, and more preferably about 40 to about 50, mole percent ethylene monomer. Other alkenes such as propylene may also be used; and additional comonomers such as vinyl acetate, acrylates, acrylic or methacrylic acid or their derivatives may also be present in amounts suitable to provide processability and toughness to the polymer. If the copolymer comprises less than about 40 mole percent vinyl alcohol, the barrier properties of the polymer are diminished. If it comprises more than about 75 mole percent vinyl alcohol, the processability of the copolymer is diminished, and in particular the thermoprocessability is diminished. In either event it becomes less suitable as a barrier layer for thermoformed structures. The vinyl alcohol moieties preferably should be substantially completely saponified, being, for example, at least 90%, preferably at least 95%, or most preferably at least 98% or even 99% saponified. Incomplete saponification leads to a reduction in barrier properties of the polymer, but can lead to improved processability; for this reason polymers with degrees of saponification as low as 80% can be used if desired.

Alternatively, the barrier layer may be a blend of polymers. Several particularly useful blends which exhibit good barrier properties and improved thermoformability properties are described in European Applications 305,146 and 380,123, the disclosure of which is incorporated herein by reference. In particular, compositions of at least about 50 percent by weight of EVOH copolymer and up to about 50 percent by weight of a polyamide component, including semicrystalline or preferably amorphous polyamide, provide improved thermoformability. Also preferred are blends of at least about 50 percent by weight EVOH and up to about 50 weight percent of a polyamide blend, which consists essentially of at least about 30 weight percent of at least one amorphous polyamide and up to about 70 percent of at least one miscible semicrystalline polyamide. A particularly suitable amorphous polyamide is a copolymer of hexamethylenediamine with isophthalic acid and terephthalic acid; preferred semicrystalline polyamides include nylon 6 and nylon 66. Likewise, the barrier layer may comprise at least about 30 weight percent, and preferably at least about 50 weight percent, of an ethylene vinyl alcohol copolymer and up to about 70 weight percent (preferably up to about 50 weight percent) of at least one ethylene copolymer other than ethylene vinyl alcohol copolymer. The other copolymer component can comprise a polymer of ethylene and acrylic or methacrylic acid moieties and a polymer of ethylene and glycidyl acrylate or methacrylate moieties.

The barrier layer may also contain customary amounts (e.g up to about 30 weight percent) of other modifiers as are known in the art for improving toughness, processability, thermal stability and the like, especially polymeric modifiers such as polyolefins, ethylene copolymers, ionomers, vinyl ester polymers, polyesters, polyethers, polyurethanes, and elastomers. Modest amounts of fillers, especially plate-like fillers such as mica and talc, can be added to further improve the barrier properties of this layer provided they do not interfere with the thermoformability of the barrier layer.

The thickness of the barrier layer (after thermoforming) will depend on the degree of barrier protection that is desired and on the effectiveness of the barrier material itself. For use in a refrigerator liner, typical thicknesses will range from about 0.002 to about 0.5 mm, preferably about 0.01 to about 0.1 mm, as measured after thermoforming. The thickness of the barrier layer before thermoforming is typically about 0.01 to 0.8 mm, preferably about 0.05 to 0.4 mm. When thinner layers are used, proportionately greater permeation can occur; use of layers thicker than this provides little added protection and is less economical.

The barrier layer is normally applied to the structural layer by lamination, a manufacturing process which is well known to those skilled in the art, although other processes such as coextrusion, extrusion coating, spray coating, powder coating, or solution coating may be used.

Figure 2:
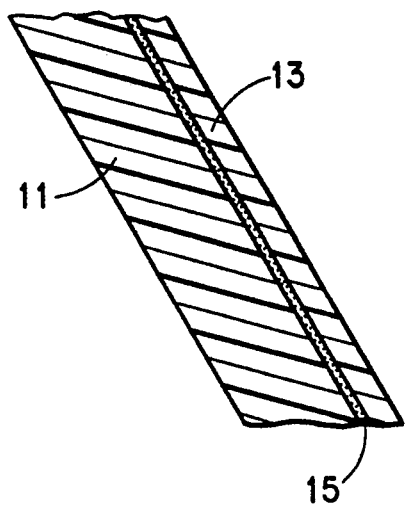
FIGS. 2, 3, and 6 show further embodiments of the invention.

Often it is preferable for an adhesive layer to be used between the structural and barrier layers. Such an arrangement is shown in FIG. 2, where 15 represents the adhesive layer. Suitable adhesives include copolymers of ethylene with one or more of acrylic or methacrylic acids or esters thereof, vinyl acetate, carbon monoxide, and the like, as well as maleic anhydride grafted polymers of the above, and styrene-containing copolymers. Preferred adhesives include those prepared from ethylene vinyl acetate copolymers, maleic anhydride grafted ethylene vinyl acetate copolymers and styrene butadiene copolymers, as described in U.S. Pat. No. 4,861,677, the disclosure of which is incorporated herein by reference. Such an adhesive layer may be quite thin, for example, about 0.025 to 0.050 mm (before thermoforming). In addition, when certain highly preferred adhesive materials are used, unexpected improvements in processing appear, as is discussed below. It is often convenient to combine the adhesive and barrier as a single sheet, prepared by coextrusion. The sheet is then laminated onto the structural polymer layer by known techniques. In a suitable lamination process, a film of EVOH and an adhesive layer passes through a nip roll along with a melt of a structural polymer in a sheet extrusion process. The adhesive layer is in contact with a hot melt of the structural polymer layer. The film of EVOH is preferably exposed to excessive heat from the molten structural polymer or from other sources before it enters the nip roll, to prevent softening of the EVOH layer and possible wrinking or sagging. The film should be laminated under sufficient tension to maintain a flat surface. A similar lamination procedure can be employed using a subsequent polishing roll rather than a nip roll, provided that the surface of the sheet is sufficiently heated to provide good adhesion.

Figure 3:
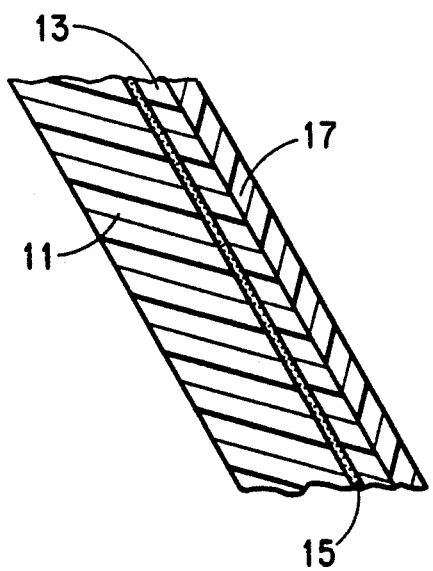

It will sometimes be desirable to provide an additional polymeric layer atop the barrier layer, as shown in FIG. 3. For example, a layer of polyethylene, 17, can be used as a release layer, since it will normally have limited adhesion to the foam layer which will be described in detail below. Use of a release layer permits separation of the liner from the foamed material as a result of differential thermal contraction of the liner and foam, thereby avoiding stress cracking of the liner. This layer and its use are described in more detail in U.S. Pat. No. 3,960,631, the disclosure of which is incorporated herein by reference. Such a layer can also be useful to prevent physical damage to the barrier layer, for example protection from scratches.

Figure 4:
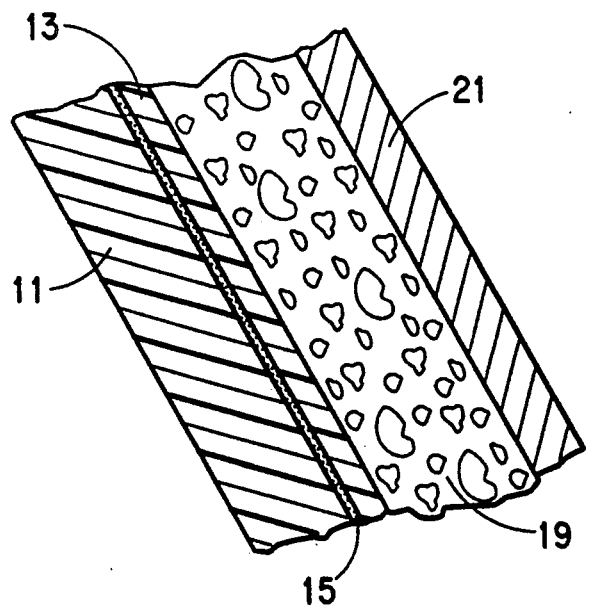
FIG. 4 is a detailed cross sectional view of an embodiment of the invention including a foamed polymer layer and an outer member.

A layer of foamed polymer is applied to the multiple layered structure described above, in such a way that the barrier layer is interposed between the foam and the structural layer. The layer of foamed polymer may be applied by methods known to those skilled in the art, but preferably by injection of the reactive polymers plus foaming agent into a confined space bounded on one side by the above multiple layered structure and on the other side by another structural member. Such an application is shown in FIG. 4, where 19 is the foam and 21 is the second structural member (not drawn to scale). The foam can be any of a number of polymeric materials well known in the art, preferably a polyurethane. The blowing agent is a material which is designed to form cells in the polymeric material and thus convert it into a foam. (The blowing agent can also itself provide additional insulative value after the foaming is completed.) Blowing agents are generally liquids at ordinary temperatures and under pressure, but they readily form a gas upon release of pressure or upon heating. While hydrocarbons such as butane, pentane, and the like have been used as blowing agents, halocarbons are preferred for their relative inertness, low flammability and toxicity, and low heat of vaporization. Recently hydrohalocarbon blowing agents have become increasingly important because of environmental concerns. A preferred hydrohalocarbon blowing agent is HCFC 123, $CHCl_2CF_3$. Others which may be used include HCFC 141B ($CHCl_2CH_2F$). It is when such hydrohalocarbons are used that the advantages of the present invention are fully realized, because of the damaging nature of such materials on the styrene-based polymers commonly used as liners for refrigerators and the like.

The present invention is most effectively employed when the multiple layered structure of the structural and the barrier layer is thermoformed into a desired shape before application of the polymeric foam. It is under such conditions that the desirable combination of thermoformability and barrier protection of the present invention is most completely realized. Thermoforming is a process which is well known to those skilled in the art. It is particularly useful for forming shaped articles, and is distinct from the initial melt processing step. Examples of articles that can be prepared by thermoforming include containers such as bowls, trays, and dishes. Most importantly for the present invention is the formation of shaped articles in the form of liners for refrigerators, freezers, and similar insulated cabinets. The liners for such articles can be prepared by thermoforming a single composite sheet of structural and barrier polymers to form the back wall and the side, bottom, and top walls of the interior storage compartment. A similar thermoforming process can be used to prepare the inner liner for the refrigerator door, which is also considered a part of the liner for purposes of this invention. The extent of deformation necessary to form a door liner is less than that for the refrigerator cavity itself, but most refrigerator doors do have a definite three-dimensional structure, with molded-in shelves and the like. It is preferable to assure that the barrier layer of the multiple layer structure is at or slightly above its softening temperature before undertaking the thermoforming process.

The thickness of the multiple layer structure, prior to thermoforming, will depend on the extent of drawing or stretching to be introduced by the thermoforming process. For formation of a full refrigerator liner the overall draw ratio may be a factor of 3-6×. Thus in order to obtain a final liner with a total thickness of about 0.4 mm, the initial sheet should be about 2 mm in total thickness. This relationship can be readily adjusted as necessary by one skilled in the art.

Whenever a formed article such as a refrigerator liner is prepared from a sheet, there will necessarily be some excess material at the edges of the sheet after forming. This material must be trimmed away from the formed article and discarder or recycled in some appropriate way. A particularly preferred embodiment of the present invention permits this scrap material to be efficiently recycled.

Figure 7:
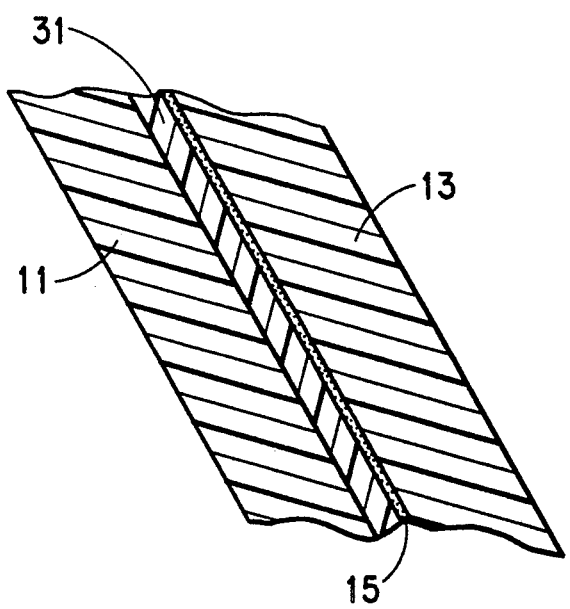
FIG. 7 is a cross sectional diagram of an embodiment of the invention in which a layer of regrind material is incorporated.

The key to this aspect of the invention is the use of a select adhesive material which serves both as an adhesive and as a compatibilizer. That is, when a sufficient quantity of the adhesive/compatibilizer is present in the structure, the scrap material can be reground and melted into a substantially uniform material which can be supplied as a separate layer without causing deterioration of the structural properties of the final structure. The resulting structure is illustrated in FIG. 7. Layers 11, 13, and 15 are, as before, the structural layer, the barrier layer, and the adhesive layer. Layer 31 represents the regrind layer and is composed of a vinyl alcohol polymer (preferably ethylene vinyl alcohol copolymer) from layer 13, the styrenic polymer from layer 11, and the adhesive from layer 15. Layer 31 can, of course, also include recycled material generated from layer 31 itself, which will normally be the case in a commercial operation.

The ability to recycle the regrind material as shown in FIG. 7 depends on selection of a material as the adhesive which will also serve to compatibilize the barrier material and the structural material so as to form a blend which retains reasonable structural strength. It has been found that a suitable class of adhesives/compatibilizers are copolymers of about 40 to about 79 weight percent ethylene comonomer, about 0.5 to about 30 weight percent of at least one comonomer selected from the group consisting of carbon monoxide and sulfur dioxide, about 20 to about 50 weight percent of at least one comonomer selected from the group consisting of unsaturated carboxylic acids, unsaturated derivatives of carboxylic acids other than anhydrides, and alkyl vinyl ethers; and about 0.01 to about 5 weight percent of at least one comonomer containing pendant carboxylic acid anhydride functionality. Such adhesives are described in copending U.S. application Ser. No. 07/734,771, the disclosure of which is incorporated herein by reference.

The CO or $SO_2$ component of this copolymer is believed to serve to increase the polarity of the copolymer, thereby increasing the level of interaction with the EVOH copolymer and thus improving the compatibilizing ability. It should be present in an amount at least sufficient to lead to such improvement. The upper limit of these comonomers is not clearly defined; 30 weight percent is considered to be a practical limit to the amount of such comonomer which can be copolymerized. Preferably this comonomer is carbon monoxide, and is present in an amount of 7-25 weight percent, more preferably about 8 to about 15 weight percent, and most preferably about 10 to about 14 weight percent.

The unsaturated acid or derivative component of this copolymer is preferably selected from the group consisting of unsaturated mono- or dicarboxylic acids having 3-18 carbon atoms, alkyl esters of such acids having 1-18 carbon atoms in the alkyl group, unsaturated alkyl nitriles having 3-18 carbon atoms, vinyl esters of saturated carboxylic acids where the acid group has 3-18 carbon atoms, and alkyl vinyl ethers wherein the alkyl group has 1-18 carbon atoms. Suitable comonomers include acrylic acid, methacrylic acid, vinyl acetate, alkyl acrylates and methacrylates having alkyl groups such as methyl, ethyl, propyl, isopropyl, n-butyl, isobutyl, t-butyl, n-pentyl, n-hexyl, 2-ethylhexyl, and the like, propyl vinyl ether, acrylonitrile, and methacrylonitrile. Preferred comonomers are alkyl acrylates and methacrylates, in particular is n-butyl acrylate. The comonomer selected from this group will preferably comprise about 25 to about 45 weight percent, and more preferably about 27 to about 40 weight percent, and most preferably about 28 to about 30 weight percent, of the main chain of the copolymer.

The final comonomer of this copolymer is at least one comonomer containing pendant carboxylic acid anhydride functionality. This comonomer can be incorporated in the polymer chain itself by well-known radical initiated polymerizations processes. Preferably, however, this comonomer is grafted onto the main chain of the polymer. The grafting monomer is selected from the group consisting of ethylenically unsaturated di-, or polycarboxylic acid anhydrides and ethylenically unsaturated carboxylic acid anhydrides. Examples of suitable anhydrides include itaconic anhydride, maleic anhydride, and dimethyl maleic anhydride; maleic anhydride (which may also be prepared from fumaric acid) is preferred.

The method for grafting of the comonomer onto the ethylene copolymer can be any of the processes which are well known in the art. For example, grafting can be carried out in the melt without a solvent, as disclosed in European Patent Application 0 266 994, incorporated herein by reference, or in solution or dispersion. Melt grafting can be done using a heated extruder, a Brabender TM or Banbury TM mixer or other internal mixers or kneading machines, roll mills, and the like. The grafting may be carried out in the presence of a radical initiator such as a suitable organic peroxide, organic perester, or organic hydroperoxide. The graft copolymers are recovered by any method which separates or utilizes the graft polymer that is formed. Thus the graft copolymer can be recovered in the form of precipitated fluff, pellets, powders, and the like.

The amount of monomer grafted onto the ethylene copolymer is not particularly limiting, and may be as low as about 0.01 weight percent or as much as about 5 percent or even more, based on the weight of the grafted ethylene copolymer. Preferably the amount of graft comonomer is 0.05 to about 1.0 or 1.5 percent of the composition, and more preferably about 0.1 to about 0.5 percent.

It is possible that certain amounts of ungrafted copolymer can also be present. Sometimes, for example, anhydride grafted copolymer compositions comprise a certain fraction of copolymer which is grafted and a fraction which is not grafted. This might arise as an artifact of the grafting process or it may be the result of a mixing process designed to reduce the cost of the relatively expensive grafted material. The presence of an ungrafted copolymer portion, otherwise chemically similar to the grafted copolymer, is specifically contemplated as an equivalent included within the scope of the present invention, provided that the overall amount of pendant anhydride functionality in the composition remains sufficiently high to provide the desired improvements.

The relative amount of this adhesive present in the structure (and therefore the amount present in the regrind layer) is that which is sufficient to provide a degree of compatibility among the layers of the multiple layer structure when they are ground and melted. A suitable degree of compatibility is that which leads to an increase in the mechanical properties of the mixture, such as impact strength, when compared with the comparable mixture prepared without use of the selected adhesive/compatibilizer. In particular, the amount of the adhesive should be about 1 to about 500 parts based on 100 parts by weight of the vinyl alcohol polymer. Preferably the amount is about 10 to about 200 parts by weight, and most preferably about 100 to about 200 parts by weight, based on 100 parts by weight of the vinyl alcohol polymer. Likewise, in structures of the present invention the relative thicknesses of the vinyl alcohol polymer layer or layers and the adhesive layer or layers should likewise be approximately in these ratios. The amount of the styrenic polymer is most preferably about 87 to about 95 percent by weight of the blend (or by thickness, of the structure).

Accordingly, the present invention encompasses a multiple layer structure comprising a layer of a styrenic structural polymer, as described above, a layer of a vinyl alcohol polymer composition, as described above, and a layer of the above-described polymeric compatibilizer or adhesive, which is present in a sufficient amount to compatibilize a melt blend prepared by comminuting and melting the layers.

The present invention further comprises the process of preparing such a multiple layer structure with a regrind layer. This process specifically can include the steps of extruding at least one layer of the thermoformable structural polymer and at least one layer prepared from comminuting and melting materials recovered from trimming of other such multiple layer structures, onto a preformed sheet of ethylene vinyl alcohol copolymer and polymeric compatibilizer. It is desirable that the melt comprising the regrind stream should be sufficiently well mixed in order to assure the maximum compatibilizing effect. It is also permissible to add a certain amount of virgin structural polymer to the regrind stream in order to further improve its structural properties, as will be apparent to a person skilled in the art.

Figure 5:
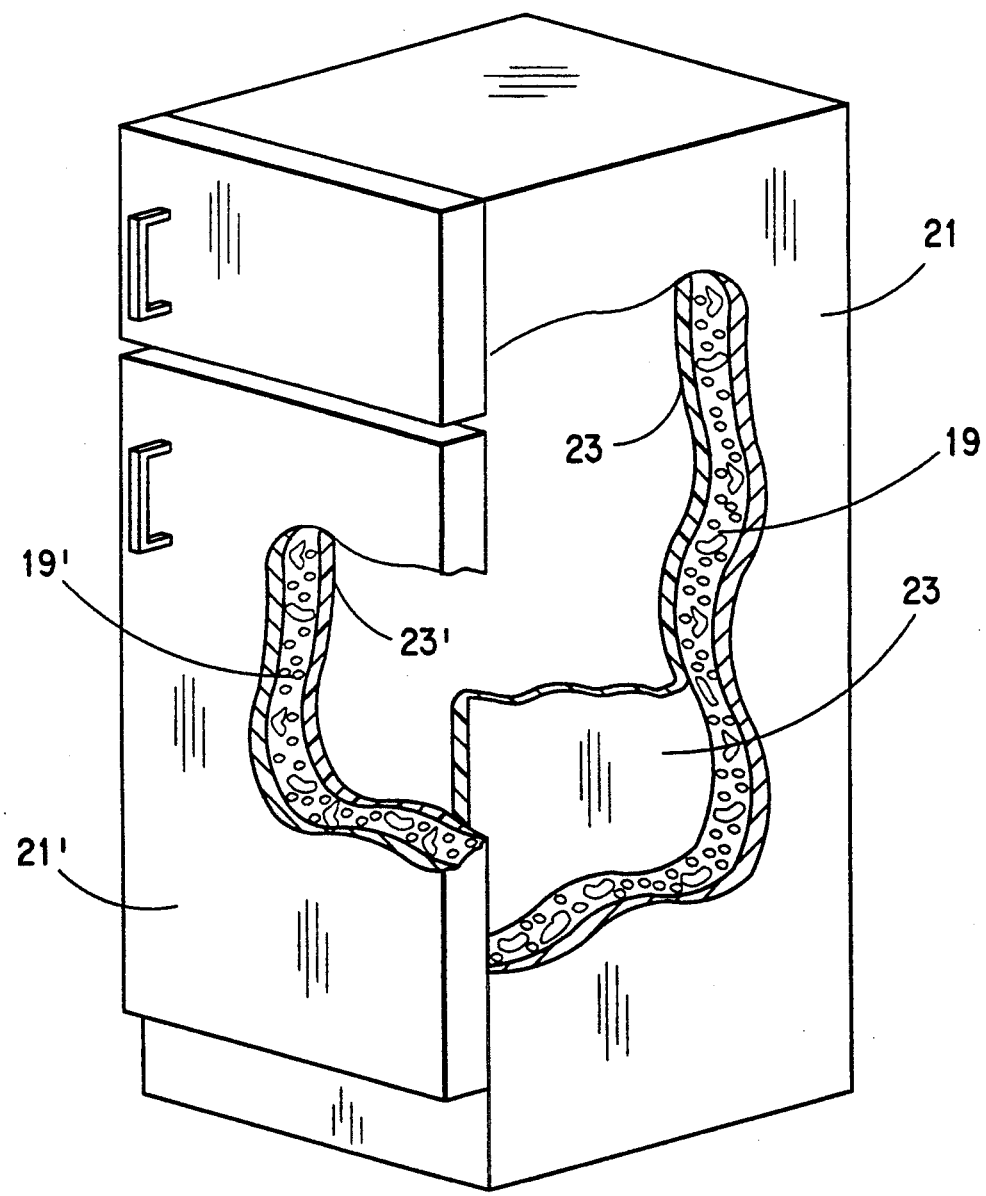
FIG. 5 shows a partially cut-away view of a refrigerator incorporating the present invention.

When the present invention is used in the formation of a refrigerator liner, the thermoformed structure is assembled to an outer member, which is normally the outer metal body or shell of the refrigerator or the refrigerator door, shown in FIG. 5 as 21 and 21'. A clearance is maintained between the thermoformed structure and the outer shell, adequate to contain a customary amount of foamed polymeric insulation, 19 and 19'. The barrier layer faces this clearance or space. A foamable polymeric composition is injected into the open space, by processes which are well known to those skilled in the art, so that the space between the outer shell and the inner liner (23 and 23') is effectively filled with insulating foam. Because of the presence of the barrier layer, the HCFC is substantially retained in the volume 19 defined by the liner 23 and the outer body 21. The HCFC blowing agent thus does not contact the inner polymeric liner, which thereby remains free from solvent-induced cracking or distortion.

Figure 6:
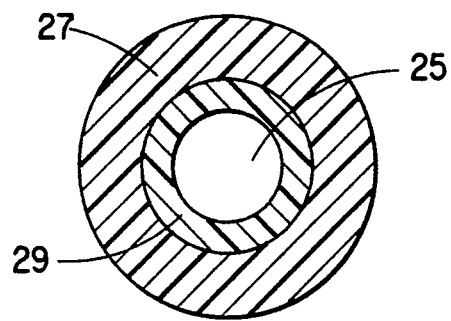

It will be recognized that the present invention is not limited to liners for refrigerators and the like, but may be employed effectively in other embodiments where it is desirable to prevent penetration of a mobile hydrohalocarbon from one volume to another volume. For example, a substantially continuous layer of a vinyl alcohol polymer can reduce or eliminate loss of refrigerant from domestic or automotive air conditioners or other refrigeration systems, when used for instance as part of a tube or hose which contains a hydrohalocarbon. Such a tube is shown schematically in FIG. 6. Refrigerant is carried within the tube, in volume 25. The bulk of the tube, 27, is a material such as an elastomer which may not provide a particularly effective barrier to penetration of hydrohalocarbon. The layer of vinyl alcohol polymer, 29, provides the needed barrier. Of course, the barrier layer need not be on the inside of the tube, as shown, but may be an exterior layer, and additional layers may also be present as may be desired. Suitable tubes can be made by crosshead extrusion, as is known to those skilled in the art. This process involves extrusion of an elastomeric layer atop a preformed tube or layer of EVOH.

EXAMPLES 1-7 AND COMPARATIVE EXAMPLES C1-C12: Permeability Measurements

The permeability of hydrohalocarbons through a layer of a variety of polymeric materials was measured by the process described in ASTM-D-1434, procedure M (November, 1982) except that a vacuum gauge rather than a manometer was used to measure differential vacuum. The materials measured were approximately 0.3-0.9 mm (0.01-0.03 inches) thick.

Steady state permeation coefficient for hydrofluorocarbon 134A ($CH_2FCF_3$) through polymeric materials, measured at 93° C., are reported in Table I, and for hydrochlorofluorocarbon 123 ($CHCl_2CF_3$) in Table II. The results show that ethylene vinyl alcohol copolymer exhibits barrier properties to these hydrohalocarbons which are about an order of magnitude better than those of many other commonly used barrier materials. Although some samples of polyesters appear to exhibit good barrier properties (Table II), such materials do not exhibit the ease of thermoformability required for many applications. For example, they often exhibit significantly higher forming temperatures than those of ABS or HIPS (about 145°-160° C. for ABS). It is believed that good barrier properties are more uniformly and reproducibly achievable using EVOH.

TABLE I

HFC 134A

| Ex. | Polymer | Permeation Coefficient[a] |
|---|---|---|
| 1 | EVOH (32 mol % ethylene) | 0.034 |
| 2 | blend of EVOH of Ex. 1 (80%) + amorphous polyamide[b] (20%) | 0.036 |
| 3 | blend of EVOH of Ex. 1 (60%) + ionomer[c] (40%) | 0.04 |
| 4 | blend of EVOH of Ex. 1 (50%) + ionomer[c] (42.5%) + E/nBA/GMA terpolymer[d] (6%) | 0.05 |
| 5 | 3 layers: EVOH of Ex. 1 (0.1 mm) + adhesive[e] (0.04 mm) + polypropylene (0.1 mm) | 0.04 |
| C1 | butadiene/acrylonitrile rubber | 13 |
| C2 | nylon 66,6 copolymer with 18% n-butylbenzene sulfonamide plasticizer | 1.79 |
| C3 | nylon 6 toughened with 19% EPDM rubber and compatibilizer | 0.21 |
| C4 | Nylon 12 | 0.52 |
| C5 | Nylon 1212 | 0.64 |
| C6 | Crystalline polyethylene terephthalate (annealed) | 0.13 |

[a] $10^{-10}$ ($cm^3$-STP) (cm)/(sec) ($cm^2$) (cm-Hg)
[b] amorphous polyamide is the copolymer of hexamethylenediamine with 70 percent isophthalic acid and 30 percent terephthalic acid.
[c] terpolymer of ethylene, 24 wt. % n-butyl acrylate, and 9 wt. % methacrylic acid, 70% neutralized with zinc ions.
[d] terpolymer containing 26 wt. % n-butyl acrylate and 1.4 wt. % glycidyl methacrylate. (The blend also contains 1% Zn stearate and 0.5% Irganox TM 1010 antioxidant.)
[e] polypropylene grafted with 0.11% maleic anhydride.

TABLE II

HCFC 123

| Ex. | Polymer | Permeation Coefficient[a] |
|---|---|---|
| 6 | EVOH (32 mol % E) | 0.121 |
| 7 | EVOH (44 mol % E) | 0.026 |
| C7 | high density polyethylene with $CaCO_3$ filler | 19.7 |
| C8 | Modified PET with ionomer and low dens. polyethylene | 3.34 |
| C9 | PET, 0.7 i.v., with ionomer and low dens. polyethylene | 0.035 |
| C10 | PET, i.v. 0.68 | 0.016 |
| C11 | Modified polyester of ethylene glycol with terephthalic and isophthalic acids (ca. 92/8) | 0.011 |
| C12 | Modified polyester similar to C12 (t/i ratio ca. 86/14) | 0.002 |

[a] $10^{-10}$ ($cm^3$-STP) (cm)/(sec) ($cm^2$) (cm-Hg)

EXAMPLES 8-9 AND COMPARATIVE EXAMPLES C13 AND C14: Solvent Stress Cracking

Samples of a polymer (ABS) which is subject to solvent stress cracking were prepared in the form of injection molded flex bars, 127 mm × 13 mm × 3.2 mm. For Examples 5 and 6 the flex bar was laminated with the ethylene-vinyl alcohol copolymer of Example 1. The test bar was placed between two sheets of EVOH each about 0.76 mm thick (without adhesive) and this structure was placed in a mold in a heated press. The resulting lamination covered both faces and the edges of the test bar. Each sample was held in a three-point metal jig which imparted 3% bending strain to the bar. The jig and the sample bar were placed in a covered glass jar which contained Freon ® 123 ($CHCl_2CF_3$). The sample was held above the liquid so that it was exposed only to the solvent vapors. The results are shown in Table III.

TABLE III

| Ex. | Sample | Results |
|---|---|---|
| C13 | ABS ("Cycolac TM DFA-1000R") | cracked through in ca. 3 minutes. |
| C14 | ABS (Monsanto) | started to crack in 4 minutes badly cracked at 9 minutes, fully cracked through at 13 minutes. |
| 8 | ABS of C9 + EVOH lamination | surface whitening behind the EVOH layer, with cracks developing over time. |
| 9 | Repeat of Ex. 3 | severely cracked after 1 hour (appears to initiate at flaws in lamination.) |

(An experiment in which coating of ABS by EVOH was attempted by solvent dipping resulted in severe cracking within 6 minutes, presumably because of incomplete coating by the EVOH.)

EXAMPLES 10 AND 11 AND COMPARATIVE EXAMPLE C15

Two- or three-layer films were prepared by extrusion lamination of a 127 micrometer (5 mil) layer of an ethylene vinyl alcohol copolymer containing 44 mole percent copolymerized ethylene to a layer 127 micrometers (5 mil) thick of an adhesive composition (Film A) or to two layers, each 64 micrometers (2.5 mils) thick of the adhesive composition, one layer on each side of the EVOH layer (Film B). In both cases the adhesive composition was a blend of 80 parts of a copolymer of ethylene with 28 weight % n-butyl acrylate and 14 weight % CO, grafted with 1.0 weight % maleic anhydride 20 parts of an ungrafted copolymer of ethylene, 30 wt.% n-butyl acrylate, and 10 wt.% CO, melt index 100 dg/min. The films can be used directly in lamination with an ABS sheet to provide a multiple layer structure in which the graft copolymer blend serves as an adhesive layer. To demonstrate regrind capability, samples of Film A and Film B, respectively, were cut into pieces about 1 cm square and dry blended with acrylonitrile-butadiene-styrene copolymer ("ABS," Cycolac TM N14 from General Electric Plastics) in the proportions indicated in Table VI. The dry blends were melt blended and then formed into test plaques as described above, and Gardner impact strength (ASTM D-3029) was measured. The results, reported in Table VI, indicate that the adhesive layer functions as a compatibilizer in the melt blend to provide blends with good impact strength.

TABLE VI

| Ex. | ABS, % | Film A, % | Film B, % | Impact Strength[a] |
|---|---|---|---|---|
| C15 | 100 | 0 | 0 | 35.2 |
| 10 | 91 | 9 | 0 | ≧36.1 |
| 11 | 91 | 0 | 9 | 34.7 |

[a] in N·m

What is claimed is:

1. A thermoformable multilayer structure comprising:
   a) a structural layer comprising a styrene based polymer;
   b) an adhesive layer comprising an adhesive copolymer whereby:
      i) about 40 to about 79 weight percent of the copolymer is derived from ethylene,
      ii) about 0.5 to about 30 weight percent of the copolymer is derived from carbon monoxide or sulfur dioxide,
      iii) about 20 to about 50 weight percent of the copolymer is derived from unsaturated carboxylic acid, unsaturated derivatives of carboxylic acids other than anhydrides or alkyl vinyl ethers, and
      iv) about 0.01 to about 5 weight percent of the copolymer is derived from a comonomer having pendant carboxylic acid anhydride functionality; and
   c) a barrier layer comprising a vinyl alcohol polymer, whereby the adhesive layer lies between the structural layer and the barrier layer.

2. The multilayer structure of claim 1 wherein the structural layer further comprises virgin styrene based polymer and recycled scrap styrene based polymer.

3. The multilayer structure of claim 2 wherein the structural layer comprises a composite structure of a first composite layer and a second composite layer, whereby the first composite layer comprises virgin styrene based polymer and the second composite layer comprises recycled scrap comprising a), b), and c) of claim 46, and whereby the adhesive layer binds the second composite layer to the barrier layer.

4. The multilayer structure of claim 1 wherein:
   about 10 to 14 weight percent of the adhesive copolymer is derived from carbon monoxide;
   about 27 to 40 weight percent of the adhesive copolymer is derived from alkyl acrylate of alkyl methacrylate; and
   about 0.1 to about 0.5 weight percent of the adhesive copolymer is derived from itaconic anhydride, maleic anhydride, or dimethyl maleic anhydride.

5. The multilayer structure of claim 1 wherein the amount of the adhesive copolymer is 1 to about 500 weight parts per hundred weights parts of vinyl alcohol polymer in the barrier layer and the thickness of the adhesive layer is 1 to 500% of the thickness of the barrier layer.

6. The multilayer structure of claim 5 wherein about 87 to 95 percent of the thickness of the structure is the structural layer.

* * * * *